(12) United States Patent
Wu

(10) Patent No.: US 11,501,669 B2
(45) Date of Patent: Nov. 15, 2022

(54) FLEXIBLE DISPLAY DEVICE

(71) Applicant: InnoLux Corporation, Miao-Li County (TW)

(72) Inventor: Yuan-Lin Wu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 51 days.

(21) Appl. No.: 17/110,306

(22) Filed: Dec. 3, 2020

(65) Prior Publication Data

US 2021/0192986 A1 Jun. 24, 2021

(30) Foreign Application Priority Data

Dec. 18, 2019 (CN) .......................... 201911310275.4

(51) Int. Cl.
| | | |
|---|---|---|
| *G09F 9/30* | (2006.01) | |
| *G06F 1/16* | (2006.01) | |
| *G02B 5/30* | (2006.01) | |
| *G06F 3/041* | (2006.01) | |

(52) U.S. Cl.
CPC ........... *G09F 9/301* (2013.01); *G02B 5/3058* (2013.01); *G06F 1/1652* (2013.01); *G06F 3/0412* (2013.01); *G06F 2203/04102* (2013.01)

(58) Field of Classification Search
CPC ...... G09F 9/301; G06F 1/1652; G06F 3/0412; G06F 2203/04102; G02B 5/3058
See application file for complete search history.

(56) References Cited

U.S. PATENT DOCUMENTS

| | | | | |
|---|---|---|---|---|
| 10,649,267 | B2* | 5/2020 | Tuan ................. | G02F 1/133305 |
| 10,672,755 | B2* | 6/2020 | Wu ........................ | H01L 27/32 |
| 2015/0077361 | A1* | 3/2015 | Seo ....................... | G06F 3/0443 |
| | | | | 359/275 |
| 2016/0147337 | A1* | 5/2016 | Lee ....................... | G06F 3/0443 |
| | | | | 345/174 |
| 2017/0052287 | A1* | 2/2017 | Lee ........................ | G02B 3/005 |
| 2017/0115579 | A1* | 4/2017 | Lin ..................... | G03F 7/70633 |
| 2018/0097197 | A1 | 4/2018 | Han | |
| 2019/0087044 | A1* | 3/2019 | Cho ....................... | G06F 3/0412 |
| 2019/0146130 | A1* | 5/2019 | Kwak ................... | G02B 5/201 |
| | | | | 359/485.05 |
| 2019/0207141 | A1 | 7/2019 | Kim | |

FOREIGN PATENT DOCUMENTS

| | | |
|---|---|---|
| CN | 103287196 A | 9/2013 |
| CN | 103649890 A | 3/2014 |

* cited by examiner

*Primary Examiner* — Joe H Cheng
(74) *Attorney, Agent, or Firm* — Winston Hsu

(57) ABSTRACT

A flexible display device is disclosed. The flexible display device includes a first layer and a second layer overlapping with the first layer. The first layer includes a plurality of first patterns, and the plurality of first patterns has a first pitch. The second layer includes a plurality of second patterns, and the plurality of second patterns has a second pitch. A ratio of the first pitch to the second pitch is greater than or equal to 2 and less than or equal to 200.

5 Claims, 12 Drawing Sheets

FLEXIBLE DISPLAY DEVICE

CROSS REFERENCE TO RELATED APPLICATIONS

This application claims priority under 35 U.S.C. § 119 of Chinese Application No. CN 201911310275.4 filed on Dec. 18, 2019, the disclosure of which is incorporated by reference.

BACKGROUND OF THE DISCLOSURE

1. Field of the Disclosure

The present disclosure relates to a flexible display device, and more particularly to a flexible display device with bending assistance.

2. Description of the Prior Art

In recent years, electronic devices or deformable electronic devices have become one of the focuses of the new generation electronic technology. Therefore, the requirements for flexible display devices that can be integrated into electronic devices are also increased accordingly. The electronic device means that this device can be curved, folded, stretched, flexed or rolled, or may be deformed in other methods. Since consumers have higher and higher requirements for flexible electronic devices, how to develop electronic devices with higher reliability is one of the important issues for manufacturers.

SUMMARY OF THE DISCLOSURE

The present disclosure provides an electronic device, which may include a flexible display device with bending assistance to assist the flexure effect of the flexible display device. In an embodiment, the flexure stability of the flexible display device may be increased through the design for the relative pitches of the patterns in different layers in the flexible display device.

An embodiment of the present disclosure provides a flexible display device. The flexible display device includes a first layer and a second layer overlapping with the first layer. The first layer includes a plurality of first patterns, and the plurality of first patterns has a first pitch. The second layer includes a plurality of second patterns, and the plurality of second patterns has a second pitch, wherein a ratio of the first pitch to the second pitch is greater than or equal to 2 and less than or equal to 200.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each element shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function.

In the following description and in the claims, the terms "include" and "comprise" are used in an open-ended fashion, and thus should be interpreted to mean "include, but not limited to . . . ".

It should be understood that when an element or layer is referred to as being "on" or "connected to" another element or layer, it may be directly on or directly connected to the other element or layer, or intervening elements or layers may be presented (indirect condition). In contrast, when an element is referred to as being "directly on" or "directly connected to" another element or layer, there are no intervening elements or layers presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The terms "substantially" typically mean+/−20% of the stated value, more typically+/−10% of the stated value, more typically+/−5% of the stated value, more typically+/−3% of the stated value, more typically+/−2% of the stated value, more typically+/−1% of the stated value and even more typically+/−0.5% of the stated value. The stated value of the present disclosure is an approximate value. When there is no specific description, the stated value includes the meaning of "substantially". Moreover, when considering the deviation or the fluctuation of the manufacturing process, the term "same" may also include the meaning of "substantially".

It should be noted that the technical features in different embodiments described in the following can be replaced, recombined, or mixed with one another to constitute another embodiment without departing from the spirit of the present disclosure.

Figure 1:
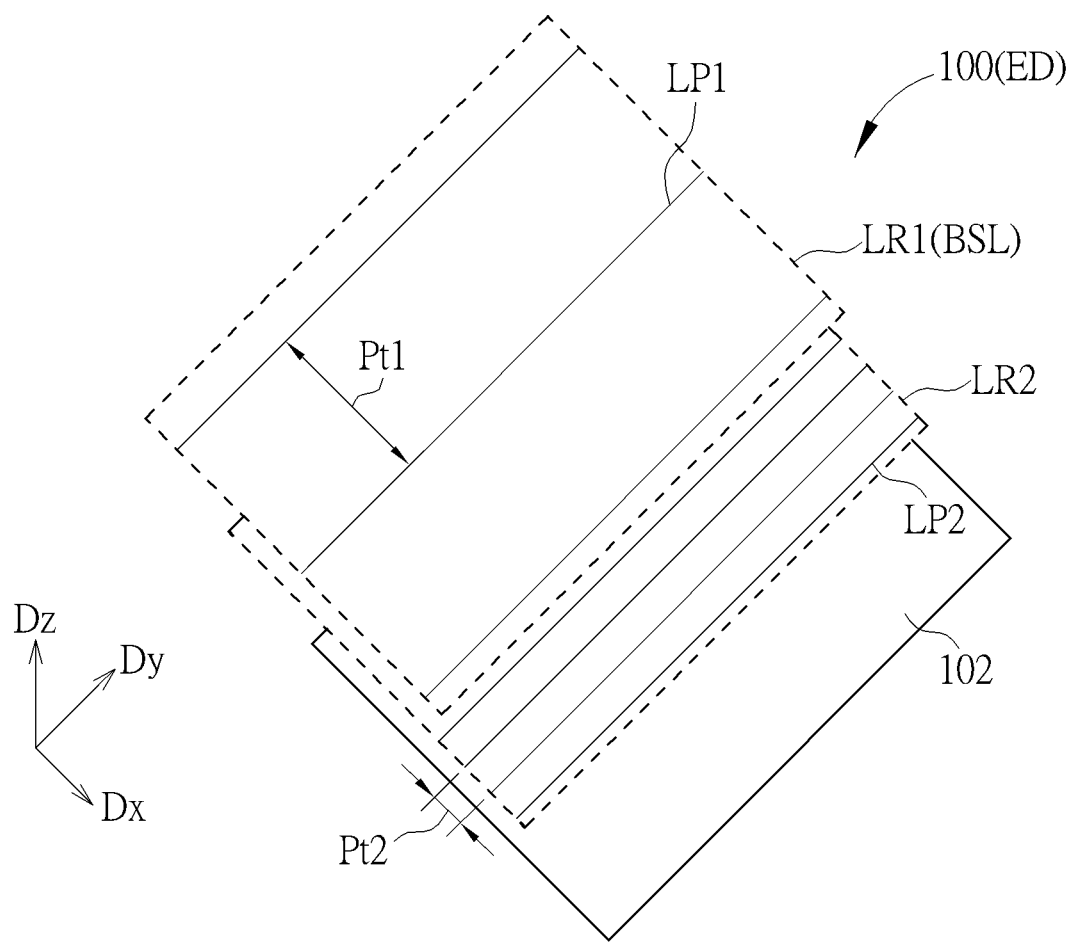
FIG. 1 is a schematic diagram of the relative relationship between the two material layers of an electronic device according to the present invention.

Please refer to FIG. 1. FIG. 1 is a schematic diagram of the relative relationship between two material layers of an electronic device according to the present invention. As shown in FIG. 1, an electronic device ED of the present disclosure may be a flexible electronic device, wherein the term "flexible" means that the electronic device ED may be curved, bent, folded, rolled, flexed, stretched, and/or other similarly deformed, and the deformation described above is represented by "flexible" hereinafter. The electronic device ED may include a display device, an antenna device, a sensor device or a tiled device, but not limited herein. The electronic device may for example include liquid crystal, fluorescence, phosphor, light emitting diode, other suitable display medium or any combination thereof, but not limited herein. The light emitting diodes (LEDs) may for example include organic light emitting diodes (OLEDs), mini LEDs, micro LEDs, nano wire LEDs, bar type LEDs, quantum dot LEDs (QLEDs, QDLEDs) or LEDs with any other suitable materials, and these materials may be disposed in any arrangement or combination, but not limited herein. The antenna device may be a liquid crystal antenna, but not limited herein. The tiled device may be a display tiled device or an antenna tiled device, but not limited herein. It is noted that the electronic device may be any arrangements or combinations of the devices described above, but not limited herein. In the following description, a display device is used as the electronic device to illustrate the content of the present disclosure. That is to say, the electronic device ED in the following description for example has display function and includes a flexible display device 100 having display elements, but the present disclosure is not limited herein. The flexible display device 100 includes a first layer LR1 and a second layer LR2. The second layer LR2 overlaps with the first layer LR1 in a vertical direction Dz, that is, at least a part of the second layer LR2 overlapping with the first layer LR1. In the structure of FIG. 1, the first layer LR1 is disposed on the second layer LR2 in the direction Dz. For example, when the flexible display device 100 includes a flexible substrate 102 and the first layer LR1 and the second layer LR2 are both disposed on the flexible substrate 102 (i.e., the flexible display device 100 includes a flexible substrate 102 thereon disposed the first layer LR1 and the second layer LR2), the second layer LR2 is disposed between the first layer LR1 and the flexible substrate 102. However, in a variant embodiment, the first layer LR1 may also be disposed below the second layer LR2. The first layer LR1 includes a plurality of first patterns LP1 extending along a direction Dy and being arranged side by side along a direction Dx, and each first pattern LP1 has a first pitch Pt1 and a first width (which is the line width of the first pattern LP1). The second layer LR2 includes a plurality of second patterns LP2, and each second pattern LP2 has a second pitch Pt2 and a second width (which is the line width of the second pattern LP2), wherein the first pitch Pt1 is greater than the second pitch Pt2, and a ratio of the first pitch Pt1 to the second pitch Pt2 is greater than or equal to 2 and less than or equal to 200. In the range described above, the optical ripple interference between the first layer LR1 and the second layer LR2 may be reduced, and better display performance may be provided. In some embodiments, the range of the first pitch Pt1 may for example be greater than 40 micrometers (μm) and less than or equal to 4000 μm, but not limited herein. In some embodiments, the first layer LR1 may be used as an assisting layer BSL. The term "assisting layer" in the present disclosure refers to that it is helpful to make the flexible display device 100 be flexed or bent toward a direction perpendicular to the extending direction (e.g., the direction Dy) of the patterns (referred to as assisting patterns, or first patterns LP1 for example) of the assisting layer BSL. The second patterns LP2 may be any conducting lines in the display layer or the touch layer, such as (but not limited to) scan lines or a data lines, or may be any one of power supply lines, common voltage lines, data lines, scan lines, signal reference lines or touch signal lines. In some embodiments, one of the plurality of first patterns LP1 has a first width (or referred to as first line width), one of the plurality of second patterns LP2 has a second width (or referred to as second line width), and a ratio of the first width to the first pitch Pt1 is less than a ratio of the second width to the second pitch Pt2. For example, the ratio of the second width to the second pitch Pt2 may be greater than or equal to 0.02 and less than or equal to 0.2.

Figure 2:
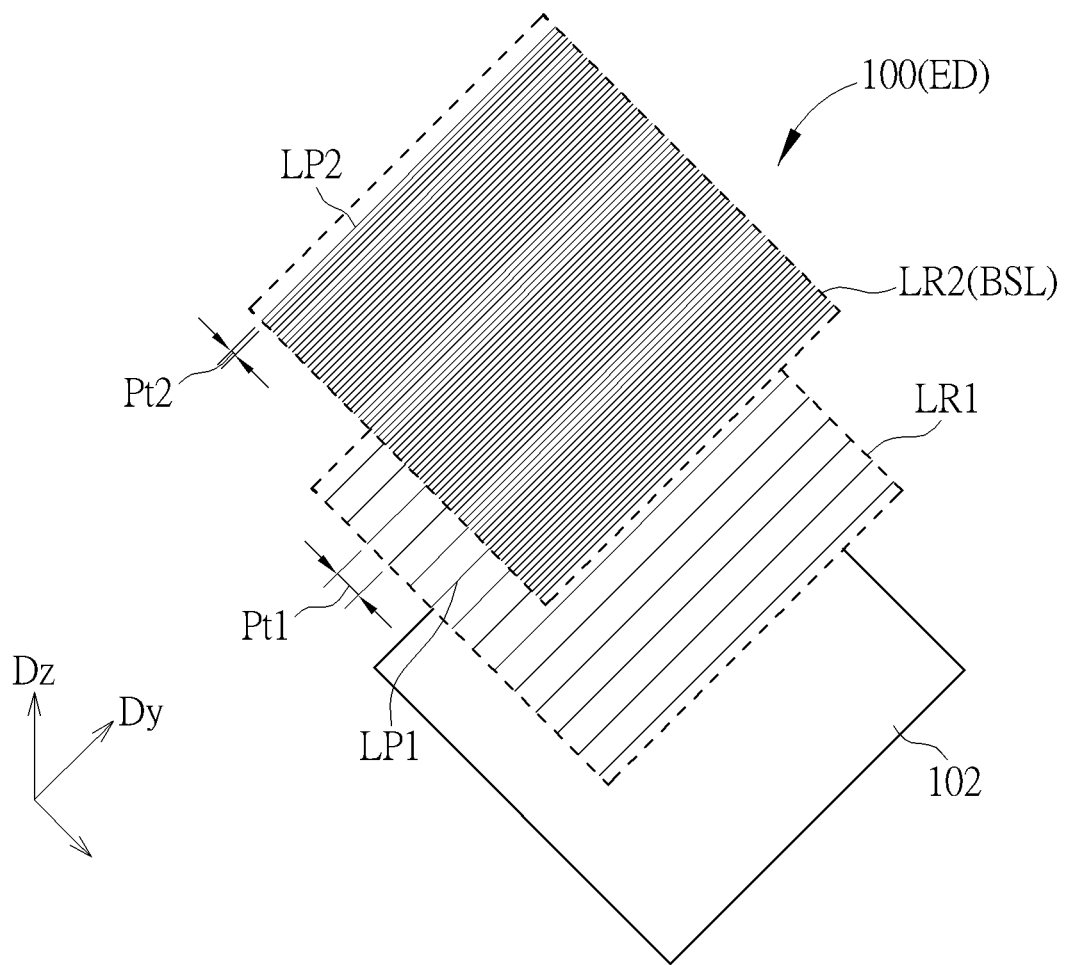
FIG. 2 is a schematic diagram of the relative relationship between the two material layers of another embodiment of an electronic device according to the present invention.

Please refer to FIG. 2. FIG. 2 is a schematic diagram of the relative relationship between two material layers of another embodiment of an electronic device according to the present invention. According to the present disclosure, the pattern pitch of the upper material layer may also be less than the pattern pitch of the lower material layer. In the structure shown in FIG. 2, the second layer LR2 is disposed on the first layer LR1. That is to say, the pitch of the upper material layer (the second pitch Pt2) is less than the pitch of the lower material layer (the first pitch Pt2), but the ratio of the first pitch Pt1 to the second pitch Pt2 is still greater than or equal to 2 and less than or equal to 200. The second pitch Pt2 may range from 0.1 μm to 40 μm, for example, from 0.1 μm to 10 μm, and the first pitch Pt1 may range from 10 μm to 20 μm, for example, 20 μm, but not limited herein. In some embodiments, the second layer LR2 may be used as the assisting layer BSL, which is helpful to make the flexible display device 100 be flexed or bent toward a direction perpendicular to the extending direction (e.g., the direction Dy) of the patterns (referred to as assisting patterns, or second patterns LP2 for example) of the assisting layer BSL. In some embodiments, the second layer LR2 may be used as a raster element. The raster element for example may provide functions such as polarization, collimation and/or privacy protection, but not limited herein. In some embodiments, the raster element may be, for example, a wire grid polarizer (WGP). The first patterns LP1 may be any conducting lines in the display layer or the touch layer, such as (but not limited to) scan lines or a data lines, or may be any one of power supply lines, common voltage lines, data lines, scan lines, signal reference lines or touch signal lines. In some embodiments, one of the plurality of first patterns LP1 has a first width, one of the plurality of second patterns LP2 has a second width, and a ratio of the first width to the first pitch Pt1 is less than a ratio of the second width to the second pitch Pt2. For example, the ratio of the second width to the second pitch Pt2 may be greater than or equal to 0.3 and less than or equal to 3, for example, greater than or equal to 0.3 and less than or equal to 0.8, and the ratio of the first width to the first pitch Pt1 may be greater than or equal to 0.02 and less than or equal to 0.2. In the ranges described above, the effect of using the second layer LR2 as the assisting layer BSL may be more obvious, the optical ripple interference between the first layer LR1 and the second layer LR2 may also be reduced, and better display effects may be provided.

The applications, structures and materials of the assisting layer BSL and the assisting patterns BSP in the electronic devices or the flexible display devices will be described in various embodiments in the following.

Figure 3:
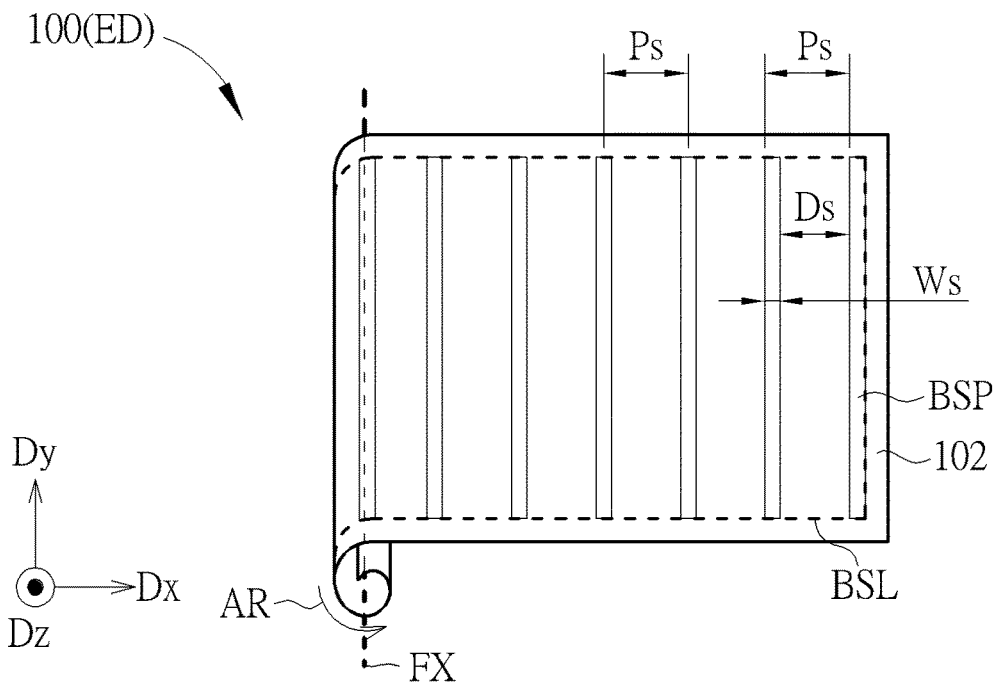
FIG. 3 is a partial exterior schematic diagram of a first embodiment of an electronic device according to the present disclosure.
Figure 4:
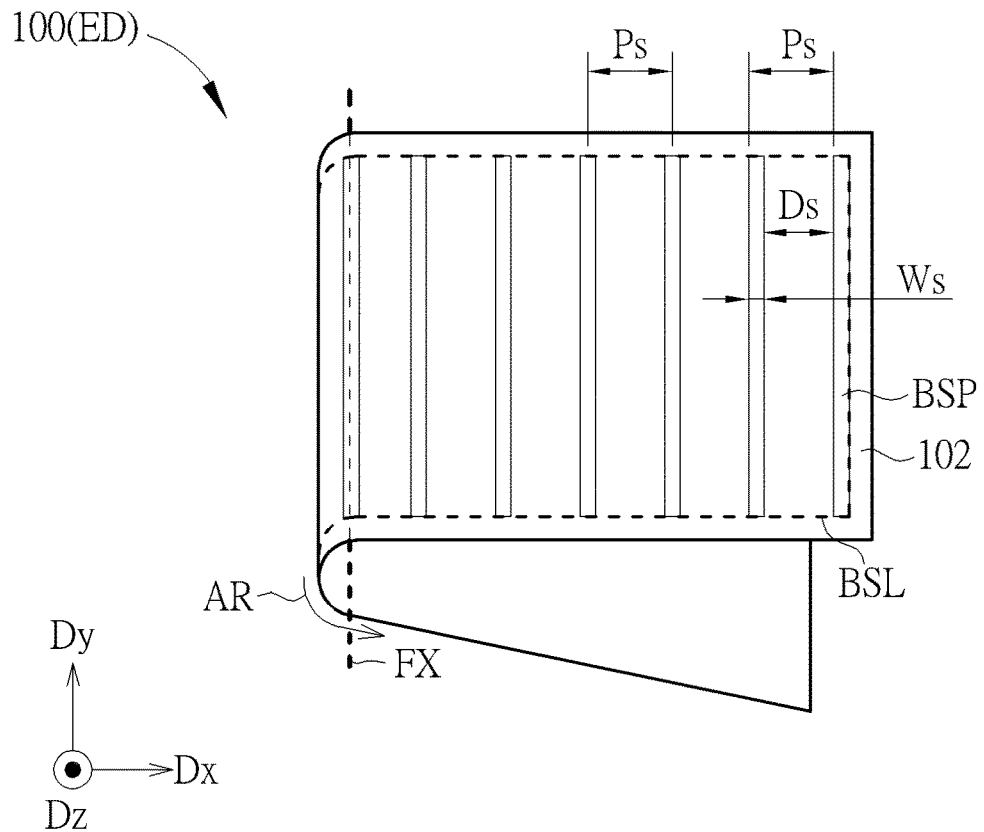
FIG. 4 is a partial exterior schematic diagram of a variation of the first embodiment of the electronic device according to the present invention.
Figure 5:
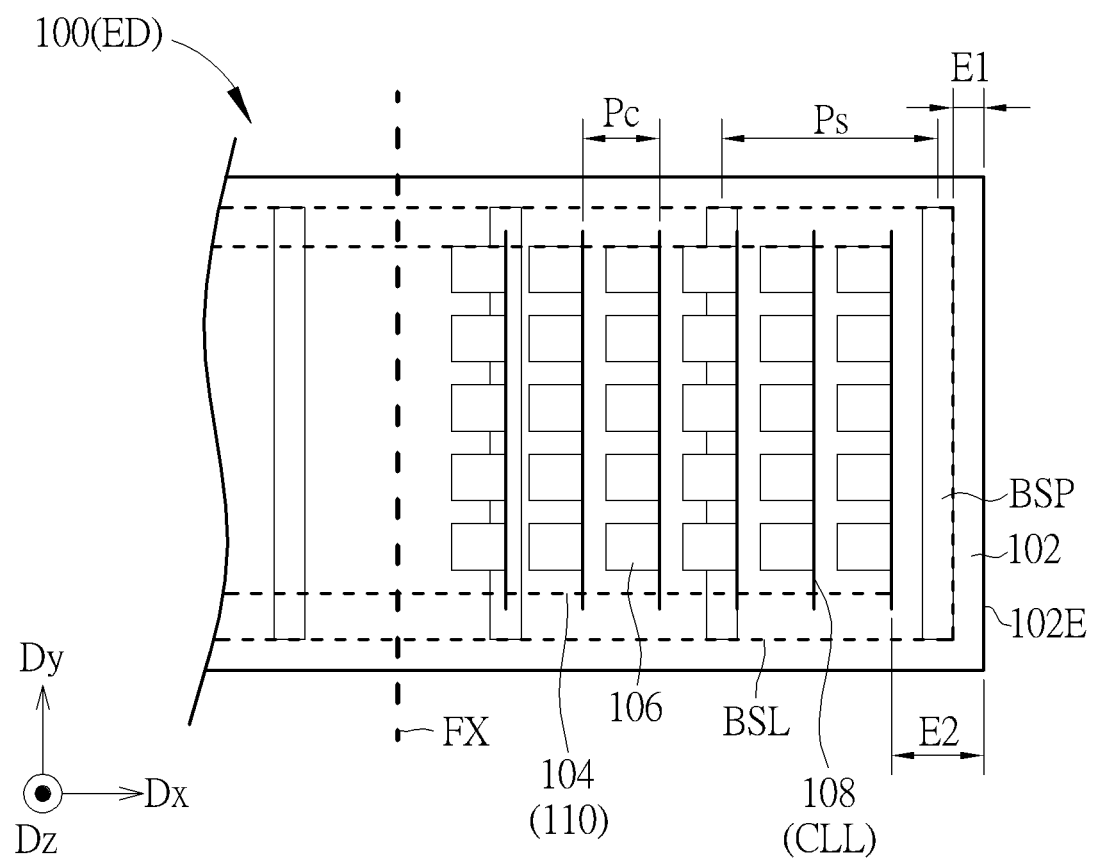
FIG. 5 is a partial top-view schematic diagram of the first embodiment of an electronic device according to the present disclosure.
Figure 6:
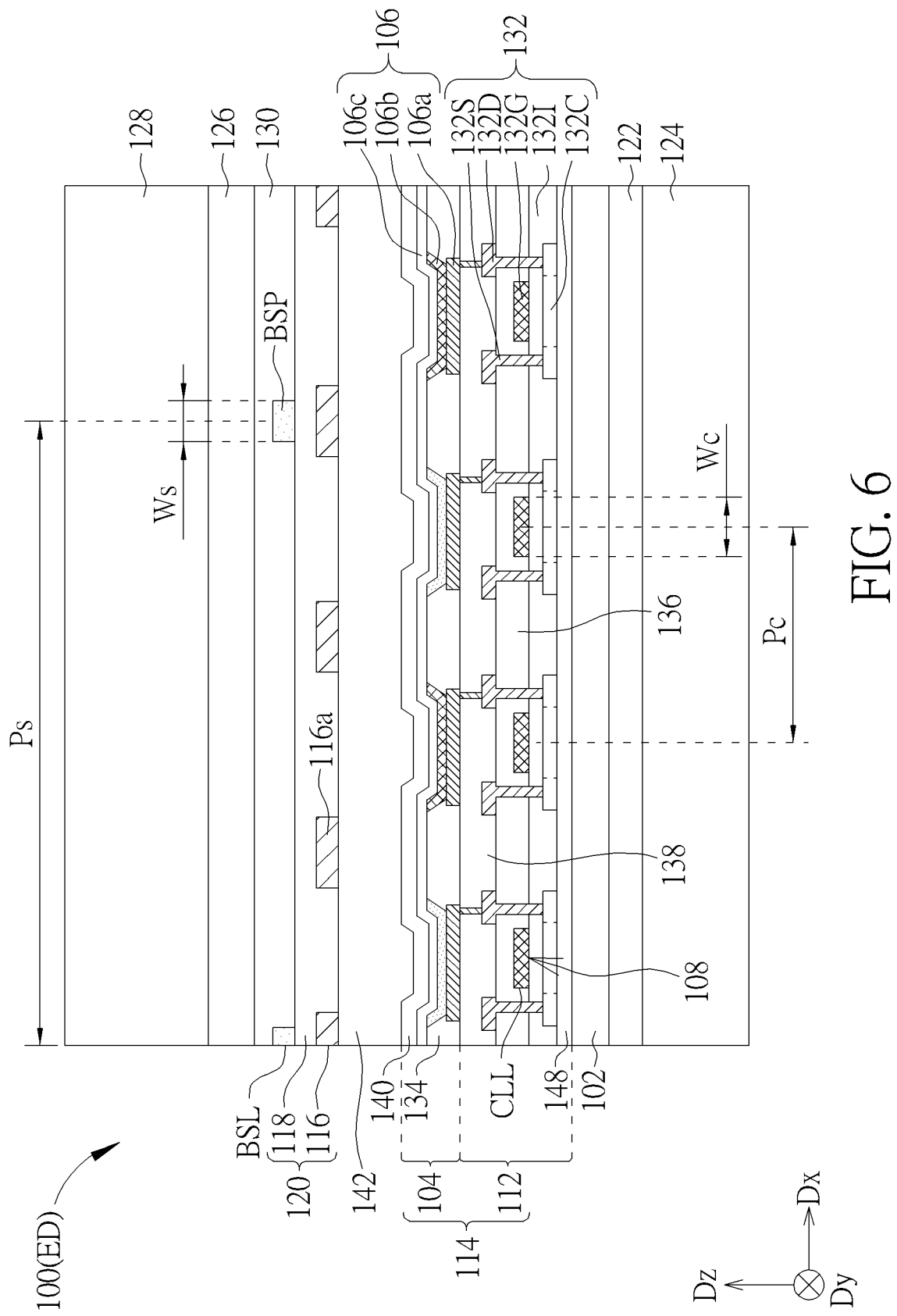
FIG. 6 is a partial sectional-view schematic diagram of the first embodiment of an electronic device according to the present disclosure.

Please refer to FIG. 3 to FIG. 6. FIG. 3 is a partial exterior schematic diagram of a first embodiment of an electronic device according to the present disclosure. FIG. 4 is a partial exterior schematic diagram of a variation of the first embodiment of the electronic device according to the present invention. FIG. 5 is a partial top-view schematic diagram of the first embodiment of an electronic device according to the present disclosure. FIG. 6 is a partial sectional-view schematic diagram of the first embodiment of an electronic device according to the present disclosure. As shown in FIG. 3, the flexible display device 100 may have a flexible substrate 102 and an assisting layer BSL. The assisting layer BSL may be disposed on a surface of the flexible substrate 102 and include a plurality of assisting patterns BSP. The flexible substrate 102 has at least one flexing axis FX substantially parallel to the extending direction of the assisting patterns BSP (e.g., the direction Dy), and a part of the flexible substrate 102 may be bent or rolled at least toward a direction perpendicular to the direction Dy (e.g., the direction Dz), for example curved along the direction of the arrow AR. Alternatively, a part of the flexible substrate 102 for example may be rolled by taking the flexing axis FX as the axis center, but the deformation and flexing manner of the flexible substrate 102 are not limited to the above. Please refer to FIG. 4, in a variation of the first embodiment of the present disclosure, a part of the flexible substrate 102 may be bent along at least one direction, and the bent portion can define a flexing axis FX.

Please refer to FIG. 3 and FIG. 5. The flexible substrate 102 may be transparent or opaque, and the material of the flexible substrate may include polymer materials such as polyimide (PI), polycarbonate (PC), polyethylene terephthalate (PET) and/or adhesive materials, but not limited herein. The flexible substrate 102 may also include thin glass or any suitable materials. The assisting layer BSL may provide suitable support for the flexible substrate 102 without affecting the flexibility of the flexible substrate 102. In detail, the assisting patterns BSP of the assisting layer BSL may provide the flexible display device 100 with a function like a bracket. The function of the assisting patterns BSP of the assisting layer BSL may assist in adjusting the bending direction or the flexing direction of the flexible substrate 102, so that the flexible substrate 102 may be bent toward a predetermined direction, and the stress in the non-bending direction can be reduced so as to mitigate the abnormal display problems. The assisting patterns BSP may be composed of any material suitable for being integrated into the flexible display device 100, for example using materials that may be cooperated with the processes of the light emitting layer, the circuit layer, the bonding layer, the light shielding layer, the light adjusting layer, the touch layer, the insulating layer and/or the protecting layer in the flexible display device 100. For example, the material of the assisting layer BSL may include, but not limited to, metals (e.g., copper or aluminum), black matrix (BM) materials or organic polymer materials. The assisting patterns BSP may be manufactured by printing, coating or other suitable methods.

In the assisting layer BSL shown in FIG. 3 (or FIG. 4), the assisting patterns BSP are generally uniformly distributed on the surface of the flexible substrate 102 and arranged side by side along the direction Dx, wherein the direction Dx intersects with the extending direction of the flexing axis FX (i.e., the direction Dy). For example the direction Dx perpendicular to the extending direction of the flexing axis Fx. In the direction Dx, the same line spacings Ds may exist between the adjacent assisting patterns BSP, and all of the assisting patterns BSP may have the same line width Ws, wherein the pitch Ps is the sum of one line spacing Ds and one line width Ws. The definition of the pitch Ps may be measured from the center of an assisting pattern BSP to the center of another adjacent assisting pattern BSP, or from the edge at a side of an assisting pattern BSP to the edge at the same side of another adjacent assisting pattern BSP. It should be noted that, the design for the assisting patterns BSP of the present disclosure is not limited to those shown in FIG. 3 and FIG. 4. The plurality of assisting patterns BSP in one assisting layer BSL may have different patterns, different line widths Ws and/or different line spacings Ds. Furthermore, the assisting patterns BSP may not be uniformly distributed on the flexible substrate 102. For example (but not limited to), the assisting patterns BSP in one region on the flexible substrate 102 (for example, but not limited to, the region farther away from the flexing axis FX) may be densely distributed, while the assisting patterns BSP in another region on the flexible substrate 102 (for example, but not limited to, the region closer to the flexing axis FX) may be loosely distributed. When the distribution of the assisting patterns BSP is not uniform, the pitch Ps of the assisting patterns BSP may be obtained by averaging the pitches Ps of all of the assisting patterns BSP in the assisting layer BSL, or by averaging the pitches Ps of five of the assisting patterns BSP, but not limited herein. In addition, according to the present disclosure, the distribution region of the assisting layer BSL may be defined by connecting the outermost edges of each assisting pattern BSP.

Please refer to FIG. 5. The flexible display device 100 may further include another material layer CLL disposed on the flexible substrate 102. The material layer CLL may be disposed on the assisting layer BSL (i.e., the assisting layer BSL is disposed between the material layer CLL and the flexible substrate 102), or the assisting layer BSL may be disposed on the material layer CLL (i.e., the material layer CLL is disposed between the assisting layer BSL and the flexible substrate 102). In other words, the present disclosure does not limit the relative positions of the material layer CLL and the assisting layer BSL on the surface of the flexible substrate 102 or in the direction DZ. In FIG. 5, the material layer CLL is illustrated on the assisting layer BSL as an example, but the present disclosure is not limited to that shown in FIG. 5. The material layer CLL may include a plurality of wire patterns 108 substantially extending along the direction Dy and having a pitch Pc, wherein the pitch Pc of the wire patterns 108 may be defined in a method similar to the pitch Ps of the assisting patterns BSP, which will not be redundantly described. In the structure shown in FIG. 5, the pitch Pc is different from the pitch Ps, and a ratio of the pitch Ps to the pitch Pc is greater than or equal to 2 and less than or equal to 200. This design may provide both of the flexibility and the support and reduce optical ripple interference, so as to provide better display effects. Precisely speaking, the material layer CLL may be included in the display layer 114 (shown in FIG. 6), and the wire patterns 108 may be used as a plurality of wires in the display layer 114, for example, for transmitting signals or providing voltages. The display layer 114 may further include a light emitting layer 104 formed of a plurality of light emitting units 106, and the corresponding region of each light emitting unit 106 may be regarded as a sub-pixel to define a display region 110 of the flexible display device 100. According to the present disclosure, the distribution region (or referred to as the distribution area) of the assisting layer BSL may be greater than the area of the display region 110. As shown in FIG. 5, in the direction Dx, the minimum distance between an edge 102E of the flexible substrate 102 generally parallel to the flexing axis FX and an outermost side of the assisting patterns BSP closest to the edge 102E is defined as an edge distance E1. The minimum distance between the light emitting layer 104 or the display region 110 and the edge 102E is defined as an edge distance E2, and the edge distance E2 is greater than the edge distance E1. In other words, in the direction Dx, the outermost assisting pattern BSP may be closer to the edge 102E than the display region 110. For example, in the direction (e.g., the direction Dz) perpendicular to the surface of the flexible substrate 102, at least a part of the assisting patterns BSP may be disposed outside the display region 110, or at least a part of the assisting layer BSL may not overlap with the display region 110 or the light emitting layer 104.

Please refer to FIG. 6, the lower side of the flexible substrate 102 may further include an adhesive layer 122 and a supporting film 124, wherein the flexible substrate 102 may be attached to the surface of the supporting film 124 through the adhesive layer 122, so that the flexible substrate 102, the adhesive layer 122 and the supporting film 124 form a substrate structure. In some embodiments, the flexible substrate 102 and the supporting film 124 may respectively include materials such as polyethylene terephthalate (PET), polyimide (PI) or polyethylene naphthalate (PEN), but not limited herein. A display layer 114 may be disposed on the flexible substrate 102, and the display layer 114 may include a circuit layer 112 and a light emitting layer 104. The circuit layer 112 may include electronic elements such as wires, driving elements, switch elements, reset elements, compensation elements, operation control elements and capacitors, so as to drive the light emitting layer 104 to emit light. For example, the circuit layer 112 includes a plurality of driving elements 132 arranged in a matrix. The driving elements 132 in FIG. 6 are represented by thin film transistors, but are not limited herein. The light emitting layer 104 includes a plurality of light emitting units 106, and each driving element 132 may be electrically connected to a corresponding light emitting unit 106 to drive the corresponding light emitting unit 106. FIG. 6 shows that the driving element 132 may at least partially overlap with the corresponding light emitting unit 106 in the vertical direction (the direction Dz) of the surface of the flexible substrate 102, but not limited herein.

The light emitting element 106 may include any kind of display medium or light emitting elements such as organic light-emitting diodes (OLEDs), micro light-emitting diodes (micro-LEDs), mini light-emitting diodes (mini-LEDs), quantum dot LEDs (QLEDs), nano wire LEDs or bar type LEDs, but not limited herein. For example, the light emitting unit 106 includes a first electrode 106a, a second electrode 106c and a display medium layer 106b disposed between the first electrode 106a and the second electrode 106c. For example, the first electrode 106a may be the anode of the light emitting unit 106 and the second electrode 106c may be the cathode of the light emitting unit 106, but not limited herein. The light emitting region of each light emitting unit 106 may be defined by an insulating layer 134 used as a pixel defining layer (PDL). The display medium layer 106b may include one or more than one layers of emissive materials, and the emissive materials may be organic or inorganic materials. The different light emitting units 106 may emit light of different colors, such as red, green and blue. For example, the display medium layers 106b of different light emitting units 106 may be made of different materials so as to emit red light, green light and blue light respectively. In some embodiments, the display medium layers 106b of different light emitting units 106 may be made of the same material to emit the same light. The first electrode 106a and the second electrode 106c may include metals or transparent conductive materials, but not limited herein. The metal material of the electrodes may include, but not limited to, magnesium, calcium, aluminum, silver, tungsten, copper, nickel, chromium, or combinations of the materials described above or alloys of one or more of the materials described above. The transparent conductive material may include, for example, indium tin oxide, indium zinc oxide, zinc oxide, indium oxide or combinations of any materials described above, but not limited herein. In addition, the surface of the light emitting unit 106 may be covered with an insulating layer 140 as a protecting layer. In some embodiments, the display medium layer 106b may be, for example, liquid crystal materials. In other embodiments, the flexible display device 100 may further include a color filter layer (not shown in the drawings) and a black matrix (not shown in the drawings) disposed on the light emitting unit 106, but not limited herein.

In the present embodiment, the driving element 132 may be a top-gate type thin film transistor (TFT), but not limited herein. The bottom-gate type thin film transistors or other suitable electronic elements may be used in other embodiments, and in the flexible display device 100, the structures of the thin film transistors may not be limited to only one type. The driving device 132 may include a semiconductor layer 132C, a dielectric layer 132I, a gate 132G a dielectric layer 136, a drain 132D and a source 132S. The semiconductor layer 132C may be formed of semiconductor materials, such as silicon or metal oxide, but not limited herein. For example, the semiconductor layer 132C may be an amorphous silicon layer, a polysilicon layer or an indium gallium zinc oxide (IGZO) layer. Furthermore, in a driving device 132, the semiconductor layer 132C includes a source contact, a drain contact and a channel disposed between the source contact and the drain contact. The source 132S is electrically connected to the corresponding source contact through an interlayer hole of the dielectric layer 136 and the dielectric layer 132I. The drain electrode 132D is electrically connected to the corresponding drain contact through another interlayer hole of the dielectric layer 136 and the dielectric layer 132I. The gate 132G is isolated from the semiconductor layer 132C through the dielectric layer 132I as a gate insulating layer in the driving element 132. The gate 132G the source 132S and the drain 132D may be formed of conductive materials (e.g., metals), but not limited herein. The materials suitable for forming the gate 132G, the source 132S and the drain 132D may refer to the materials for forming the first electrode 106a and the second electrode 106c described above. In the present disclosure, a driving element 132 may be electrically connected to the corresponding light emitting unit 106 through the drain 132D to drive the light emitting unit 106. Precisely speaking, the drain 132D may be directly connected to the first electrode 106a of the light emitting unit 106. In addition, the dielectric layer 138 may be disposed between the first electrode 106a of the light emitting unit 106 and the conductive layer forming the source 132S and the drain 132D.

Furthermore, a buffer layer 148 may be disposed between the flexible substrate 102 and the display layer 114. The buffer layer 148 may include, for example, an oxide layer, a nitride layer or other suitable insulating layer, but not limited herein. Moreover, an encapsulating layer 142 may be disposed on the display layer 114. The encapsulating layer 142 may provide protection, encapsulation and/or planarization functions for the display layer 114, and the encapsulating layer 142 may include organic materials, inorganic materials, the arrangement combinations or mixtures of the above, but not limited herein. For example, the encapsulating layer 142 may be a multi-layer structure including an inorganic layer, an organic layer and an inorganic layer. In some embodiments, the encapsulating layer 142 may be replaced by another flexible substrate (not shown in the drawings), and a color filter layer and/or a black matrix may be disposed on this flexible substrate, but not limited herein. In another aspect, the flexible display device 100 may further have touch function, such as selectively including a touch layer 120. The conductive layer 116 in the touch layer 120 may be used to form touch elements 116a and/or touch signal lines, and the insulating layer 118 may cover the conductive layer 116. In the direction Dz, the arrangement of the touch elements 116a and the touch signal lines may not cover the light emitting regions of the light emitting units 106, or at least a part of the touch elements 116a and the touch signal lines may not be overlapped with the light emitting units 106, but not limited herein. In addition, a polarizing layer 126 may be selectively disposed on the touch layer 120, wherein the polarizing layer 126 for example includes organic material, and a transparent covering layer 128 may further be selectively disposed on the polarizing layer 126, wherein the transparent covering layer 128 for example includes such glass or organic material, but the present disclosure is not limited to the above.

In FIG. 6, the assisting layer BSL is disposed on the display layer 114 and the touch layer 120 and disposed below the polarizing layer 126, that is, the assisting layer BSL is disposed between the touch layer 120 and the polarizing layer 126. In addition, an insulating layer 130 having the function of a planar layer may be disposed on the assisting layer BSL. In the direction Dz, each assisting pattern BSP may correspondingly overlap with a touch element 116a, and each assisting pattern BSP may correspondingly overlap with the PDL insulating layer 134 to expose the light emitting unit 106, so as to increase the aperture ratio. The distribution density of the assisting patterns BSP may be smaller than the distribution density of the touch elements 116a, but the present disclosure is not limited herein. For example, in some embodiments, each touch element 116a may respectively correspond to an assisting pattern BSP. In addition, in the structure shown in FIG. 6, the conductive layer used to form the gate 132G may be regarded as the material layer CLL mentioned in FIG. 5, and the wire patterns 108 (shown in FIG. 5) included in the material layer CLL for example serve as scan lines of the display layer 114, but not limited herein. In other embodiments, the wire patterns 108 may also be one of power supply lines, common voltage lines, data lines, signal reference lines and touch signal lines. In this embodiment, the assisting layer BSL may correspond to the first layer LR1 in FIG. 1, the assisting patterns BSP may correspond to the first patterns LP1 in FIG. 1, the pitch Ps may correspond to the first pitch Pt1 in FIG. 1, the material layer CLL may correspond to the second layer LR2 in FIG. 1, the wire patterns 108 may correspond to the second patterns LP2 in FIG. 1, and the pitch Pc may correspond to the second pitch Pt2 in FIG. 1. In addition, the ratio of the first pitch Pt1 to the second pitch Pt2 is greater than or equal to 2 and less than or equal to 200. This design may provide both of the flexibility and the support and reduce optical ripple interference, so as to provide better display effects. Furthermore, the line width Ws of one of the first patterns is defined as a first width, and the line width Wc of one of the second patterns is defined as a second width. The ratio of the first width (i.e., the first width Ws) to the first pitch Ps (i.e., the pitch Ps) is less than the ratio of the second width (i.e., the line width Wc) to the second pitch (i.e., the pitch Pc). In some embodiments, the ratio of the second width to the second pitch is greater than or equal to 0.02 and less than or equal to 0.2, but not limited herein. From the above description, it should be understand that the first layer is disposed on the second layer in this embodiment, that is, the second layer is disposed between the flexible substrate and the first layer. For example, the first pitch Ps may range from 40 μm to 4000 μm, and the second pitch Pc may range from 1 μm to 20 μm.

It should be noted that, the structure of the flexible display device 100 of the present disclosure is not limited to the above description, and the assisting layer BSL may be disposed at other suitable positions of the sectional structure.

In the following description, other embodiments or variant embodiments of the present disclosure will be described. For simplifying the illustration, the same films or elements in the following embodiments will be represented with the same symbols, and the features thereof will not be described redundantly. The differences between various embodiments will be described in detail below.

Figure 7:
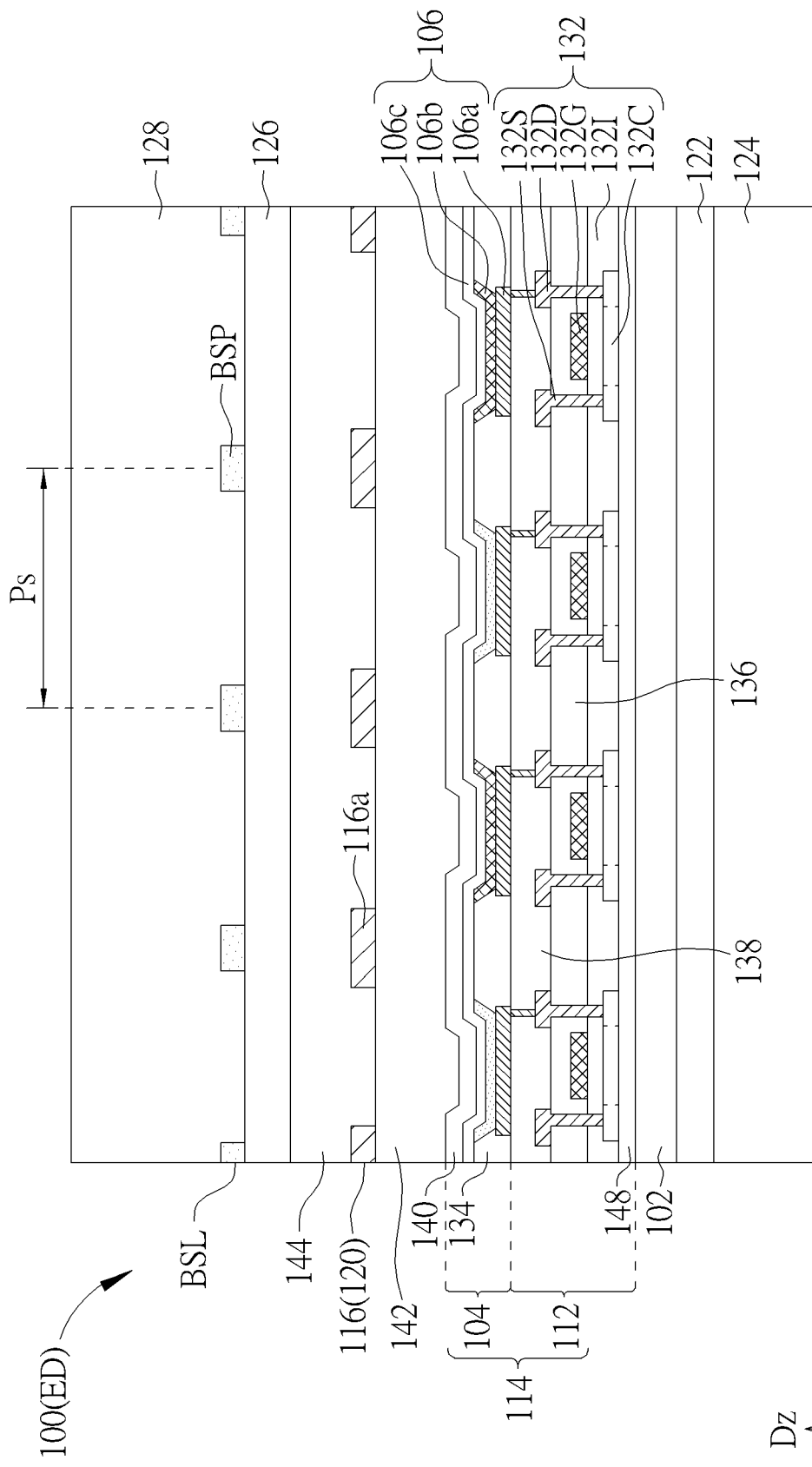
FIG. 7 is a partial sectional-view schematic diagram of a second embodiment of an electronic device according to the present disclosure.

Please refer to FIG. 7. FIG. 7 is a partial sectional-view schematic diagram of a second embodiment of an electronic device according to the present disclosure. In some embodiments, the assisting patterns BSP of the assisting layer BSL are disposed on the polarizing layer 126 and the display layer 114. In addition, in the structure shown in FIG. 7, the touch layer 120 may not include the insulating layer 118, and the conductive layer 116 forming the touch elements 116a is directly disposed on the encapsulating layer 142. The flexible display device 100 further includes another encapsulating layer 144 directly covering and contacting the touch elements 116a, and the encapsulating layer 144 is disposed between the assisting layer BSL and the touch elements 116a. The encapsulating layer 144 is, for example (but not limited to), an organic material layer with a greater thickness, so that the distance between the assisting layer BSL and the touch layer 120 may be greater in the direction Dz. When the assisting layer BSL includes metal materials, this design may reduce the effect of the assisting layer BSL on sensing signals by the touch elements 116a or transmitting signals by the touch signal lines. The distribution density of the assisting patterns BSP in FIG. 7 is greater than the distribution density of the assisting patterns BSP in FIG. 6, and the pitch Ps in FIG. 7 is less than the pitch Ps in FIG. 6. For example, an assisting pattern BSP may correspond to a touch element 116a or a touch wire, but the present disclosure is not limited herein. For example, the assisting layer BSL, the assisting patterns BSP and the pitch Ps may correspond to the first layer, the first patterns and the first pitch in FIG. 1 or FIG. 2. Furthermore, any kind of wires in the flexible display device 100 that are substantially parallel to the assisting patterns BSP may be regarded as the second patterns in FIG. 1 or FIG. 2, and the material layer forming these wires and the pitch of these wires may correspond to the second layer and the second pitch in FIG. 1 or FIG. 2, wherein the first pitch is different from the second pitch, and the ratio of the first pitch to the second pitch is greater than or equal to 2 and less than or equal to 200. In another example, the assisting layer BSL, the assisting patterns BSP and the pitch Ps may correspond to the second layer, the second patterns and the second pitch in FIG. 1 or FIG. 2. Furthermore, any kind of wires in the flexible display device 100 that are substantially parallel to the assisting patterns BSP may be regarded as the first patterns in FIG. 1 or FIG. 2, and the material layer forming these wires and the pitch of these wires may correspond to the first layer and the first pitch in FIG. 1 or FIG. 2, wherein the first pitch is different from the second pitch, and the ratio of the first pitch to the second pitch is greater than or equal to 2 and less than or equal to 200. For example, when the ratio of the pitch Ps of the assisting patterns to the wire pitch formed by the material layer forming these wires is greater than or equal to 2 and less than or equal to 200, the assisting layer BSL may be regarded as the first layer in FIG. 1 or FIG. 2, and the material layer may be regarded as the second layer in FIG. 1 or FIG. 2. On the other hand, when the ratio of the wire pitch formed by the material layer forming these wires to the pitch Ps is greater than or equal to 2 and less than or equal to 200, the assisting layer BSL may be regarded as the second layer in FIG. 1 or FIG. 2, and the material layer may be regarded as the first layer in FIG. 1 or FIG. 2. Under the conditions described above, the assisting layer BSL may provide the support function as mentioned above, which is helpful to make the flexible display device 100 be flexed toward a predetermined direction, and reduce the stress effects generated during bending in other directions. If the assisting patterns BSP have a smaller pitch Ps and a larger line width Ws, good support effects may be provided. However, if the pitch Ps is too small and the line width Ws is too large, the overall flexibility of the flexible display device 100 may be reduced. Therefore, the design of the present disclosure makes the pitch of the assisting patterns BSP satisfy the above design, so as to provide the desired flexibility and support effects.

Figure 8:
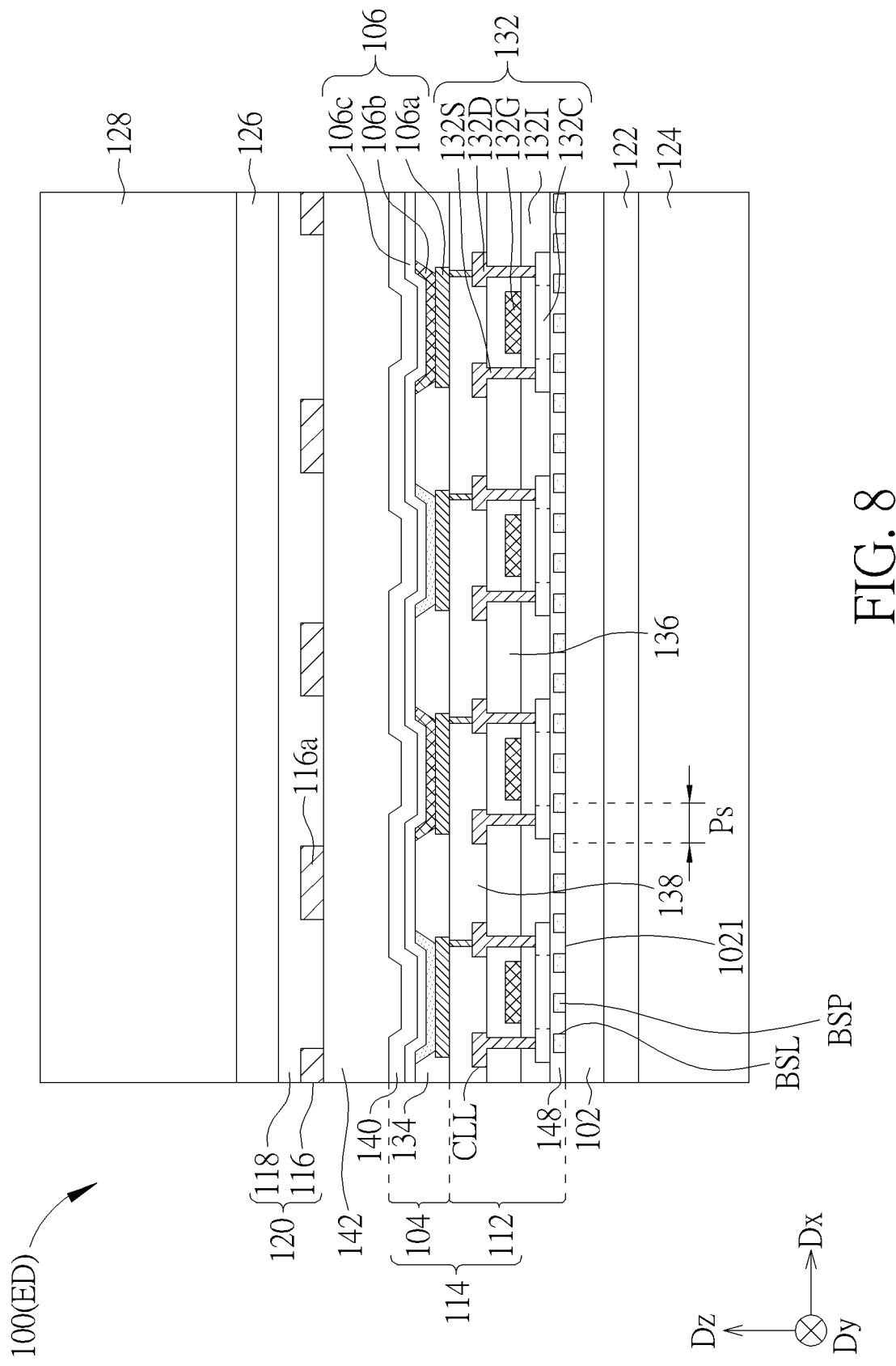
FIG. 8 is a partial sectional-view schematic diagram of a third embodiment of an electronic device according to the present disclosure.

Please refer to FIG. 8. FIG. 8 is a partial sectional-view schematic diagram of a third embodiment of an electronic device according to the present disclosure. In some embodiments, the assisting patterns BSP of the assisting layer BSL are disposed on the upper surface 1021 of the flexible substrate 102, that is, the assisting layer BSL is disposed between the flexible substrate 102 and the display layer 114. Furthermore, the polarizing layer 126 may directly contact the touch layer 120, for example, disposed on the upper surface of the insulating layer 118 in the touch layer 120. The assisting layer BSL, the assisting patterns BSP and the pitch Ps respectfully correspond to the first layer, the first patterns and the first pitch in FIG. 1 or FIG. 2, or may respectfully correspond to the second layer, the second patterns and the second pitch in FIG. 1 or FIG. 2. Furthermore, a certain material layer CLL in the flexible display device 100 used to form wires may be regarded as the other one in FIG. 1 or FIG. 2 (regarded as the second layer or the first layer), such that the wires formed by the material layer CLL and the pitch of the wire may be regarded as the other one in FIG. 1 or FIG. 2 (regarded as the second patterns and the second pitch or as the first patterns and the first pitch) relative to the assisting patterns BSP and the pitch Ps. In FIG. 8, the conductive layer forming the data lines is regarded as the material layer CLL, wherein the source 132S and the drain 132D are both formed by the conductive layer, but the present disclosure is not limited herein. In the embodiment shown in FIG. 8, the ratio of the first pitch to the second pitch is also designed as being greater than or equal to 2 and less than or equal to 200. For example, in this embodiment, when the ratio of the wire pitch formed by the material layer CLL to the pitch Ps is greater than or equal to 2 and less than or equal to 200, the assisting layer BSL may be regarded as the second layer in FIG. 1 or FIG. 2, and the material layer may be regarded as the first layer in FIG. 1 or FIG. 2. In other embodiments, the pitch Ps of the assisting patterns BSP may be greater than the pitch of the wires formed by the material layer CLL. That is to say, when the ratio of the pitch Ps of the assisting patterns BSP to the pitch of the wires formed by the material layer CLL is greater than or equal to 2 and less than or equal to 200, the assisting layer BSL may be regarded as the first layer in FIG. 1 or FIG. 2, and the material layer CLL may be regarded as the second layer in FIG. 1 or FIG. 2.

Figure 9:
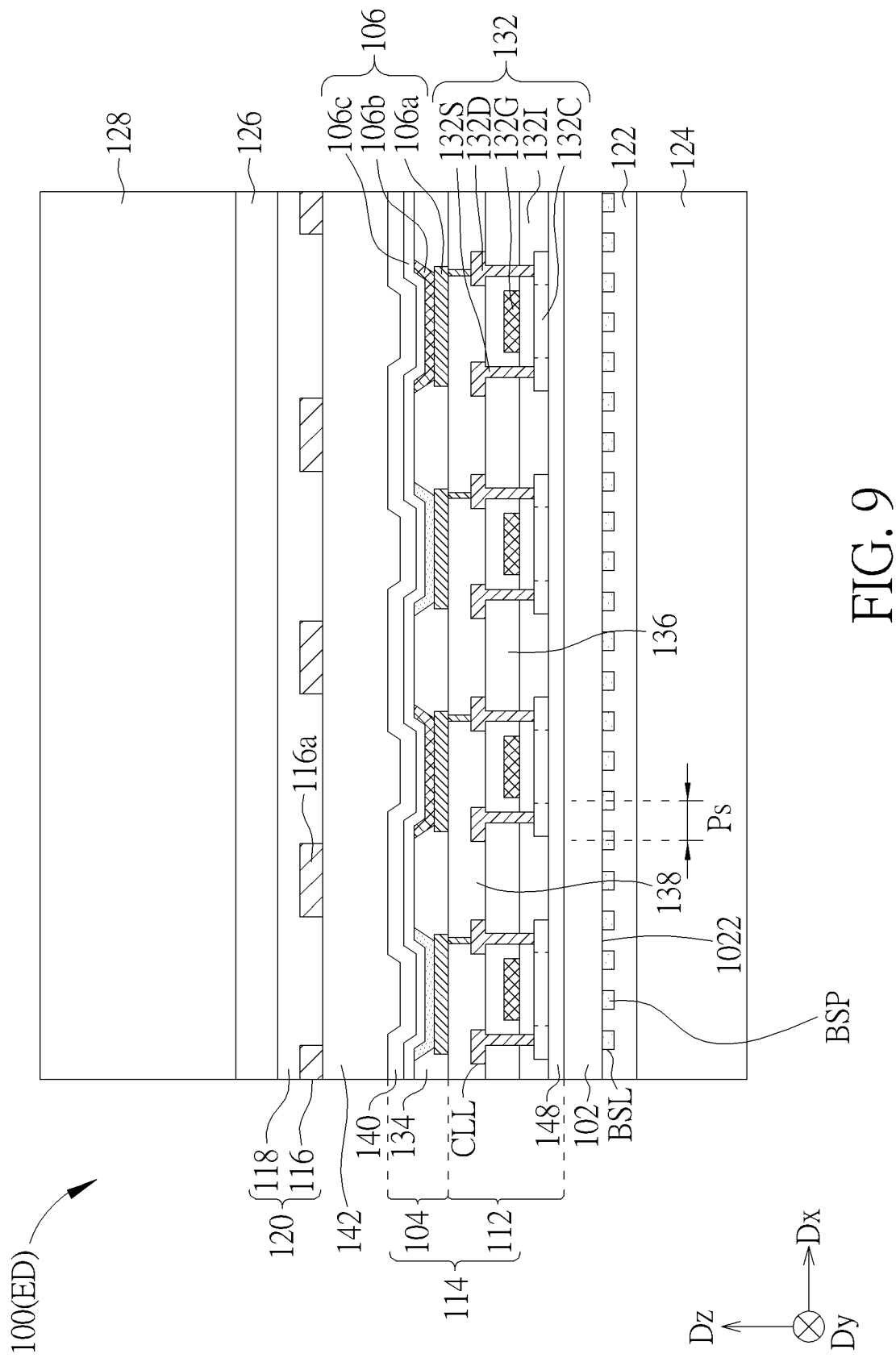
FIG. 9 is a partial sectional-view schematic diagram of a fourth embodiment of an electronic device according to the present disclosure.

Please refer to FIG. 9. FIG. 9 is a partial sectional-view schematic diagram of a fourth embodiment of an electronic device according to the present disclosure. The main difference between the structure shown in FIG. 9 and FIG. 8 is that the assisting layer BSL and the assisting patterns BSP are disposed on the lower side of the flexible substrate 102 and formed on the lower surface 1022 of the flexible substrate 102, and the adhesive layer 122 may directly cover the assisting patterns BSP. In other words, the assisting layer BSL is disposed between the flexible substrate 102 and the adhesive layer 122. In this design, the assisting layer BSL, the assisting patterns BSP and the pitch of the assisting patterns may respectively correspond to the first layer, the first patterns and the first pitch in FIG. 1 or FIG. 2, or may respectively correspond to the second layer, the second patterns and the second pitch in FIG. 1 or FIG. 2. In addition, the selection of another material layer may be referred to the description of FIG. 8 and FIG. 7, and will not be redundantly described.

Figure 10:
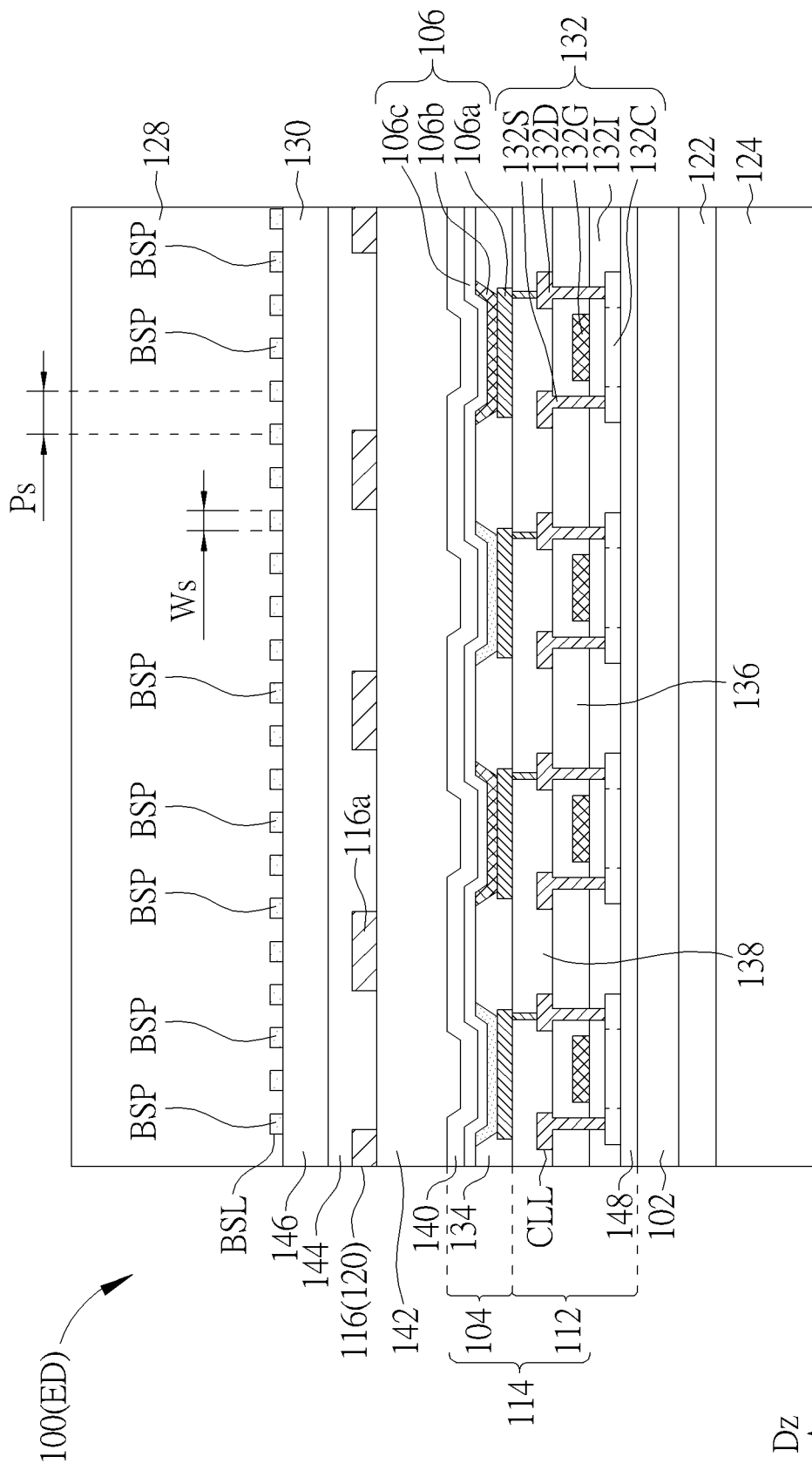
FIG. 10 is a partial sectional-view schematic diagram of a fifth of an electronic device according to the present disclosure.

Please refer to FIG. 10. FIG. 10 is a partial sectional-view schematic diagram of a fifth of an electronic device according to the present disclosure. In the structure shown in FIG. 10, the assisting layer BSL may be used as a raster element. In FIG. 10, the assisting layer BSL is used as a wire grid polarizer (WGP) as an example, which may replace the polarizing layer 126 in the previous embodiment. The assisting layer BSL is disposed on the display layer 114 and the touch layer 120, and the material of the assisting layer BSL may for example include molybdenum (Mo), titanium (Ti), tantalum (Ta), niobium (Nb), hafnium (Hf), nickel (Ni), chromium (Cr), cobalt (Co), zirconium (Zr), tungsten (W), aluminum (Al), copper (Cu) and so on or the alloys or combinations of the materials described above, but not limited herein. An insulating layer 146 may be disposed between the assisting layer BSL and the encapsulating layer 142 and the encapsulating layer 144, wherein the insulating layer 146 may also be a quarter-wavelength phase retarder, but not limited herein. In this embodiment, the assisting patterns BSP have a smaller pitch Ps, for example, smaller than the pitch of the data lines. Furthermore, the assisting layer BSL, the assisting patterns BSP and the pitch Ps may be regarded as the second layer, the second patterns and the second pitch in FIG. 2, and another material layer CLL in the flexible display device 100 may be regarded as the first layer in FIG. 2. For example, the conductive layer used to form the data lines (not symbolized) may be regarded as the first layer, the data lines may be regarded as the first patterns, and the pitch of the data lines may be regarded as the first pitch. In this embodiment, the first pitch is greater than the second pitch, and the ratio of the first pitch to the second pitch is greater than or equal to 2 and less than or equal to 200. In this embodiment, the second layer is disposed on the first layer, the line width of the first pattern is regarded as the first width (e.g., the line width of the data line), and the ratio of the first width to the first pitch may be less than the ratio of the second width (the line width Ws) to the second pitch (the pitch Ps). For example, the ratio of the first width to the first pitch is greater than or equal to 0.02 and less than or equal to 0.2, and the ratio of the second width to the second pitch is greater than or equal to 0.3 and less than or equal to 3, for example, the ratio of the second width to the second pitch ranging from 0.3 to 0.8, but the present disclosure is not limited herein. In an example of the present disclosure, the line width Ws may be 150 nanometers (nm) for example, and the pitch Ps may be 300 nm for example, so that the ratio of the second width to the second pitch is 0.5. In another example of the present disclosure, the line width Ws may be 80 nm for example, and the pitch Ps may be 200 nm for example, so that the ratio of the second width to the second pitch is 0.4.

Figure 11:
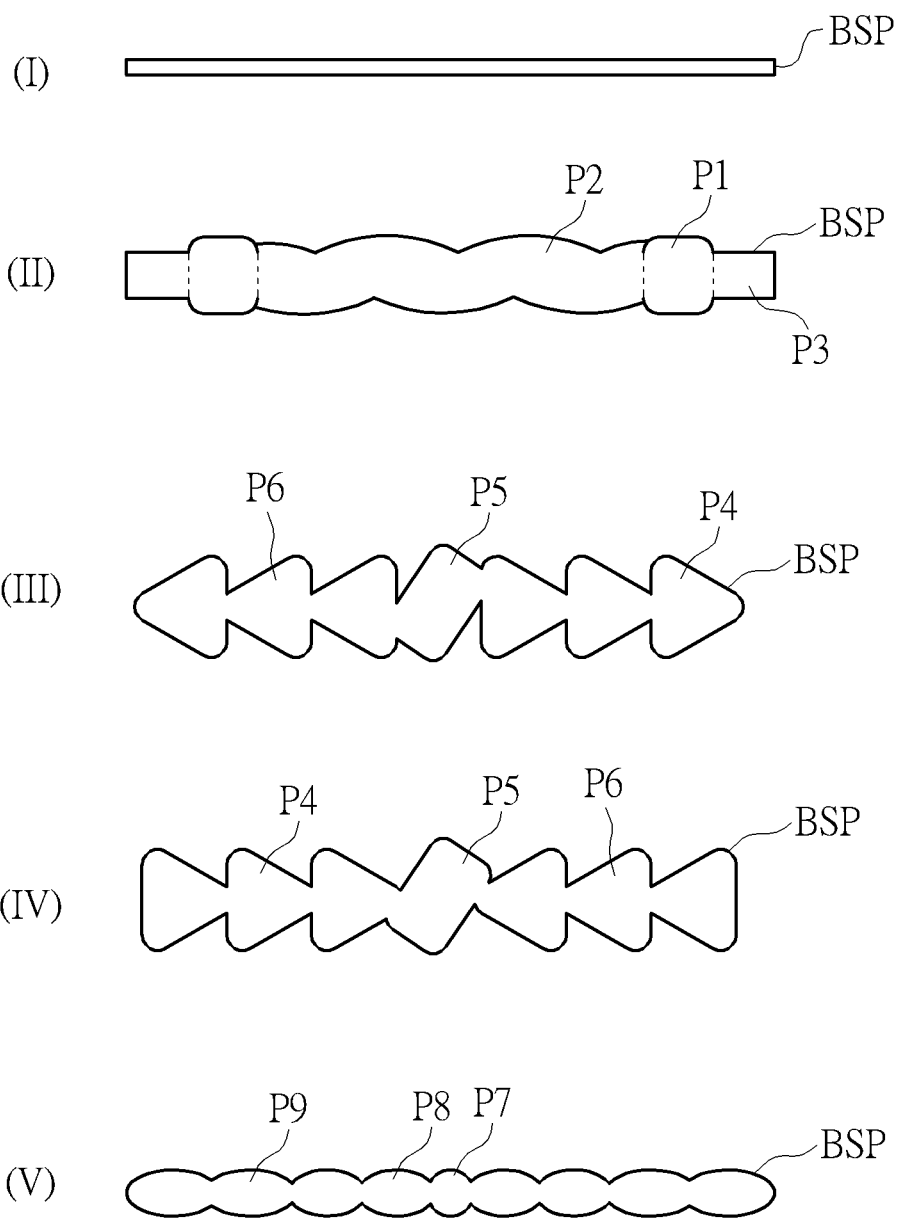
FIG. 11 is a partial top-view schematic diagram of various examples of assisting patterns of an electronic device according to the present disclosure.

Please refer to FIG. 11. FIG. 11 is a partial top-view schematic diagram of examples of assisting patterns of an electronic device according to the present disclosure. According to the present disclosure, although the assisting patterns BSP extend along a direction (e.g., the direction Dy in FIG. 1), the practical patterns of the assisting patterns BSP may have different designs, for example having unsmooth sides or concave-convex edges. In the example (I), the assisting pattern BSP may have a linear pattern with substantially smooth two sides. In the example (II), the assisting pattern BSP may be formed of a plurality of portions, such as a portion P1 with a shape similar to a rectangular or a square, a portion P2 with a twist shape and a portion P3 with a long strip shape or a long rectangular shape, and these three portions are disposed alternately. For example, one portion P2 is disposed between two portions P1, and two portions P1 are disposed between two portions P3. In the example (III), the assisting pattern BSP may be formed of a plurality of portions with different shapes, such as portions P4 and portions P6 respectively with a triangle-like shape and a portion P5 with a shape similar to a rhombic or an inclined rectangular, wherein the sharp corner of each portion P4 faces to the right and is disposed on the right side of the portion P5, the sharp corner of each portion P6 faces to the left and is disposed on the left side of the portion P5, and the portion P5 is disposed between the portions P4 and the portions P6. In the example (IV), the sharp corner of each portion P4 faces to the right and is disposed on the left side of the portion P5, the sharp corner of each portion P6 faces to the left and is disposed on the right side of the portion P5, and the portion P5 is disposed between the portions P4 and the portions P6. In the example (V), the assisting pattern BSP may be formed of a plurality of portions with different shapes, such as a portion P7 with a circle pattern, a portion P8 with an elliptical shape and a portion P9 with a long elliptical shape, wherein the portion P7 may be disposed between adjacent two or a plurality of portions P8, and the portions P8 may be disposed between adjacent two or a plurality of portions P9. The assisting patterns BSP of the present disclosure is not limited to those shown in FIG. 8, and any suitable pattern designs may be applied to the assisting patterns BSP of the present disclosure. It should be noted that, the pitch, the width and the line spacing of the assisting patterns BSP of the present disclosure may be designed according to the requirements. For example, in an electronic device, the assisting patterns BSP may have the same pitch, but the line width and/or the line spacing of each assisting pattern BSP are not completely the same. In another embodiment, the pitch, the line width and/or the line spacing of each assisting pattern BSP may not be completely the same.

Figure 12:
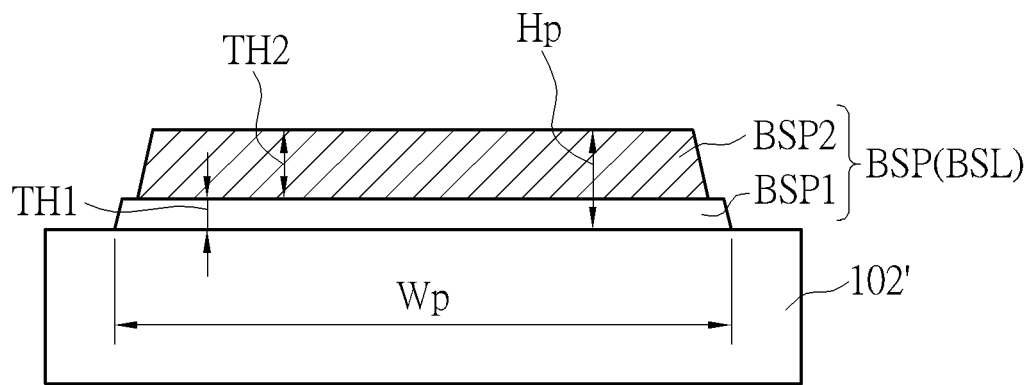
FIG. 12 is a partial sectional-view schematic diagram of a first variant embodiment of an assisting layer of an electronic device according to the present disclosure.

Please refer to FIG. 12. FIG. 12 is a partial sectional-view schematic diagram of a first variant embodiment of an assisting layer of an electronic device according to the present disclosure. FIG. 12 illustrates a cross-sectional shape of an assisting pattern BSP of the assisting layer BSL, wherein the assisting pattern BSP is disposed on the surface of the substrate 102', and the substrate 102' in FIG. 12 may be represented to include the flexible substrate 102 in FIG. 1 to FIG. 10 and any other films on the surface of the flexible substrate. For example, the substrate 102' may selectively include the flexible substrate 102, the circuit layer 112, the light emitting layer 104, the encapsulating layer 142, the encapsulating layer 144 and the insulating layer 146, but not limited herein. According to the present disclosure, the assisting layer BSL may be a composite structure. For example, the assisting layer BSL (or the assisting patterns BSP) may be a double-layer structure or a multi-layer structure including a first sub-assisting layer BSP1 and a second sub-assisting layer BSP2 sequentially disposed on the surface of the substrate 102', wherein the first sub-assisting layer BSP1 has a thickness TH1, and the second sub-assisting layer BSP2 has a thickness TH2. The thickness TH2 may be different from the thickness TH1, and for example, the thickness TH2 is greater than the thickness TH1. In some embodiments, the ratio of the total thickness Hp of the assisting layer BSL to the maximum line width Wp of the composite structure may be greater than or equal to 0.2 and less than or equal to 2. For example, the material of the first sub-assisting layer BSP1 may include a material with better adhesion including titanium, molybdenum and so on, and the material of the second sub-assisting layer BSP2 may include a material with better wire extension including aluminum, copper and so on.

Figure 13:
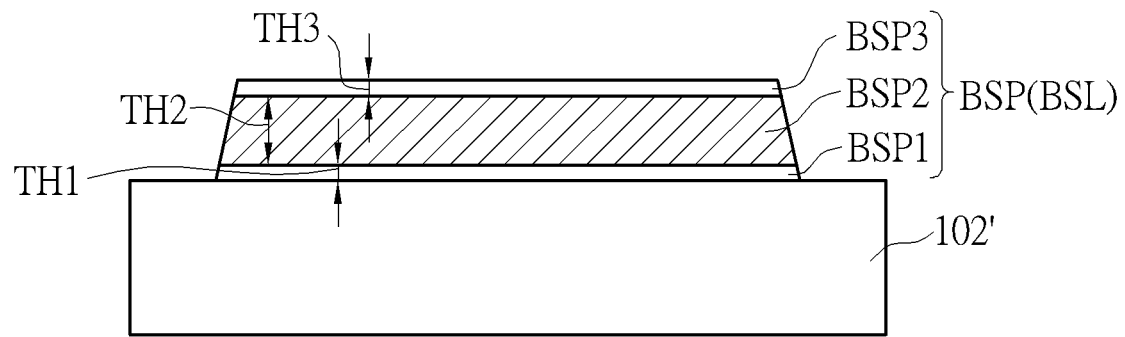
FIG. 13 is a partial sectional-view schematic diagram of a second variant embodiment of an assisting layer of an electronic device according to the present disclosure.

Please refer to FIG. 13. FIG. 13 is a partial sectional-view schematic diagram of a second variant embodiment of an assisting layer of an electronic device according to the present disclosure. In FIG. 13, the assisting layer BSL (or the assisting pattern BSP) may include a three-layer structure. For example, the assisting layer BSL (or the assisting pattern BSP) may include a first sub-assisting layer BSP1, a second sub-assisting layer BSP2 and a third sub-assisting layer BSP3 are sequentially disposed on the substrate 102'. A thickness TH2 of the second sub-assisting layer BSP2 may be greater than a thickness TH1 of the first sub-assisting layer BSP1, and/or the thickness TH2 of the second sub-assisting layer BSP2 may be greater than a thickness TH3 of the third sub-assisting layer BSP3. For example, the material of the first sub-assisting layer BSP1 and the third sub-assisting layer BSP3 may include the materials with better adhesion including titanium, molybdenum and so on, and the material of the second sub-assisting layer BSP2 may include a material with better wire extension including aluminum, copper and so on, but not limited herein.

Figure 14:
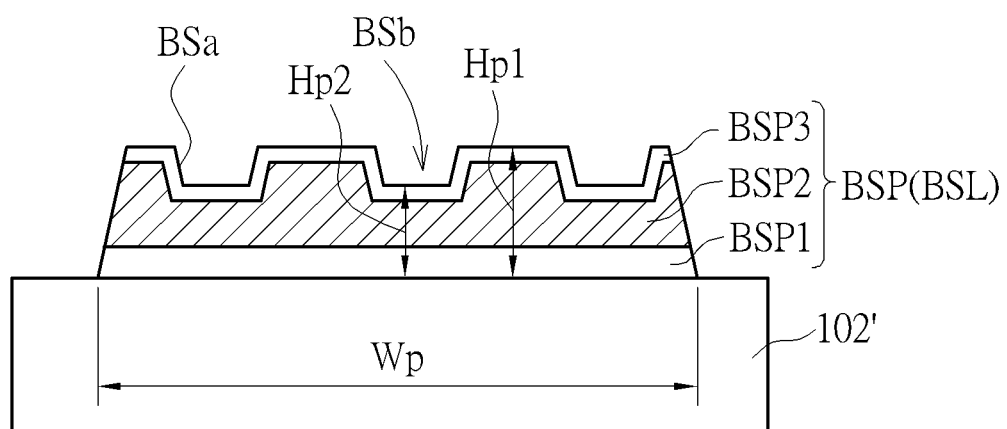
FIG. 14 is a partial sectional-view schematic diagram of a third variant embodiment of an assisting layer of an electronic device according to the present disclosure.

Please refer to FIG. 14. FIG. 14 is a partial sectional-view schematic diagram of a third variant embodiment of an assisting layer of an electronic device according to the present disclosure. The structure of this variant embodiment is similar to the structure of FIG. 13. The assisting layer BSL (or the assisting pattern BSP) may include a first sub-assisting layer BSP1, a second sub-assisting layer BSP2 and a third sub-assisting layer BSP3 sequentially disposed on the substrate 102', but the difference is that the assisting layer BSL may include an undulating surface BSa with higher heights and lower heights. For example, the surface of the second sub-assisting layer BSP2 may have cavities BSb, so the third sub-assisting layer BSP3 disposed on the second sub-assisting layer BSP2 forms an uneven surface BSa. In other words, the three-layer composite structure of the assisting layer BSL includes at least two thicknesses, such as a thickness Hp1 and a thickness Hp2, wherein the ratio of the maximum thickness Hp1 to the maximum line width Wp of the assisting pattern BSP may be greater than or equal to 0.2 and less than or equal to 2, but the present disclosure is not limited herein. In some embodiments, the assisting layer BSL can also be, for example, a multilayer structure, and the multilayer structure includes at least two or more than two thicknesses, but not limited herein.

From the above description, the flexible display device of the present disclosure at least includes two material layers, one of the material layers may be designed as an assisting layer including a plurality of assisting patterns extending along a direction (e.g., the direction Dy), and the other material layer may select any wire material layer in the display layer or the touch layer of the flexible display device, wherein the wire material layer includes a plurality of repeated wires of a plurality of parallel assisting patterns, and the pitch and the line width of the assisting patterns have a specific relationship with the pitch and the line width of the wires of the wire material layer. The two material layers describe above may be regarded as the first layer or the second layer in FIG. 1 or FIG. 2 according to the design requirements, and the ratio of the first pitch to the second pitch is greater than or equal to 2 and less than or equal to 200. This design may reduce optical ripple interference, make the assisting patterns to achieve the function of assisting the flexure of the display device, and provide better display effects.

Figure 15:
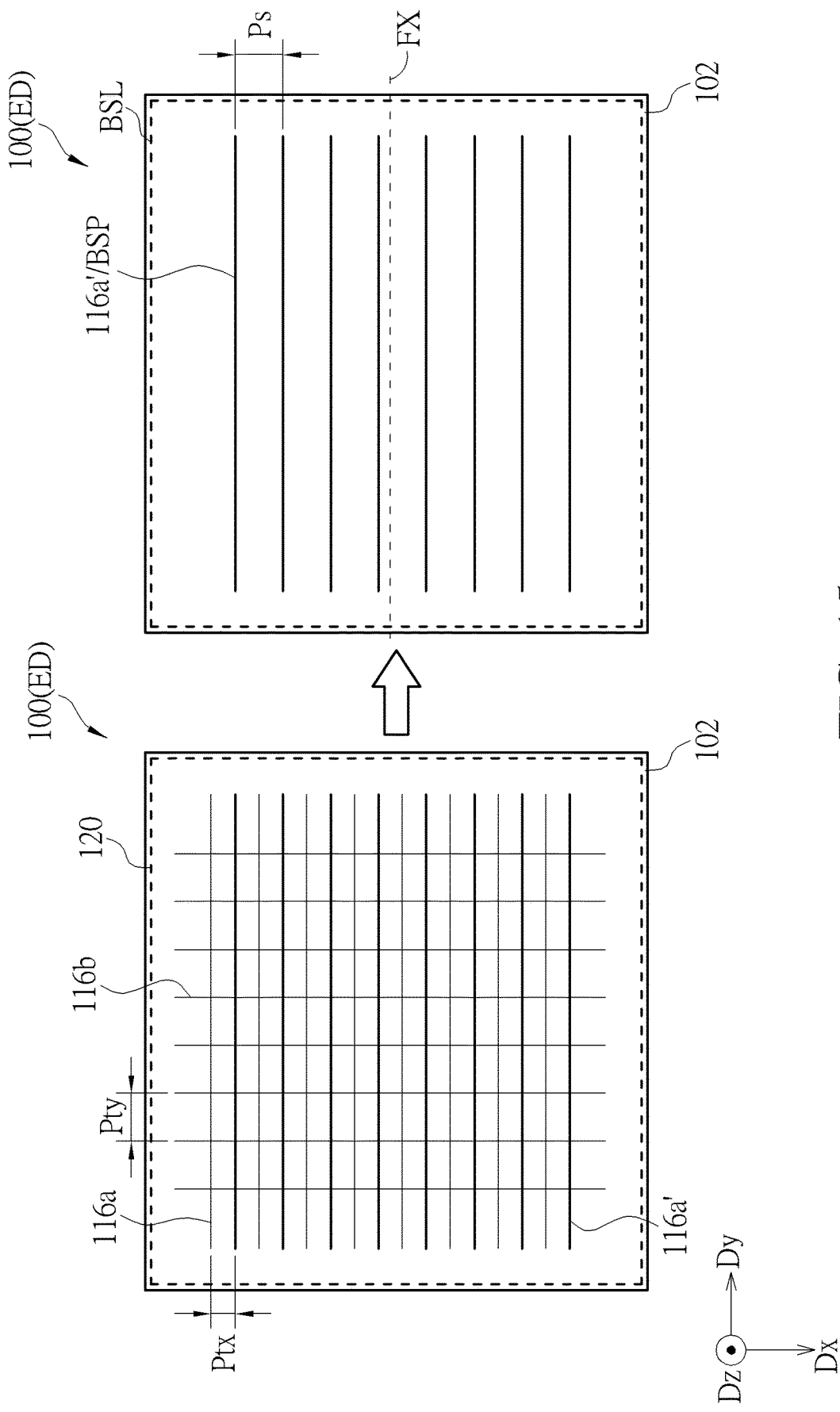
FIG. 15 is a top-view schematic diagram of an assisting layer of another embodiment of an electronic device according to the present disclosure.

Please refer to FIG. 15. FIG. 15 is a top-view schematic diagram of an assisting layer of another embodiment of an electronic device according to the present disclosure. In the embodiment shown in FIG. 15, the assisting layer BSL may be integrated to the touch layer 120, that is, the touch elements 116a (represented by thin lines), the touch elements 116a' (represented by thick lines) or wires in the touch layer 120 may be used as the assisting patterns BSP. For example, the touch layer 120 may include the touch elements 116a and the touch elements 116a' that are extending along the direction Dy and the touch elements 116b extending along the direction Dx, wherein the touch elements 116a and the touch elements 116a' have a pitch Ptx in the direction Dx, and the touch elements 116b have a pitch Pty in the direction Dy. According to the design of the present disclosure, the pitch Ptx is different from the pitch Pty. For example, the pitch Pty is greater than the pitch Ptx, or for example (but not limited to), the pitch Pty is twice the pitch Ptx. That is to say, the distribution density of the touch elements 116a and the touch elements 116a' is greater than the distribution density of the touch elements 116b. Since the pitch Ptx is different from the pitch Pty, when the flexible display device 100 is flexed, the flexure effect of the touch elements 116a and the touch elements 116a' on the flexible display device 100 in the direction Dy is different from the flexure effect of the touch elements 116b on the flexible display device 100 in the direction Dx. For example, since the pitch Ptx is smaller, it is helpful to make the flexible display device 100 bend in a direction perpendicular to the extending direction of the touch elements 116a' (e.g., the direction Dy), for example, being bent in a direction Dx perpendicular to the direction Dy, and the bent portion may define a flexing axis FX, which is generally parallel to the extending direction of the touch elements 116a' (e.g., the direction Dy). The flexible display device 100 may be flexed or bent by taking the flexing axis FX as the axis center. Precisely speaking, the number of the touch elements 116a having the same distance and the number of the touch elements 116b having the same distance are generally the same, so the effect on flexure stress of the touch elements 116a may offset against the effect on flexure stress of the touch elements 116b, and both of the touch elements 116a and the touch elements 116b may not provide the function of assisting flexure, but the effect on flexure stress of the touch elements 116b may not offset against the effect on flexure stress of the touch elements 116a'. Therefore, the touch elements 116a' may be regarded as the assisting patterns BSP having a pitch Ps, and the touch layer 120 may be regarded as the assisting layer BSL of the present disclosure. In brief, when the material layer manufactured by the same process has patterns extending in different directions, the patterns in the two directions may be designed to have different pitches. For example, the patterns parallel to the flexing axis FX has a smaller pitch or a larger average distribution density, so that the patterns may provide the function of the assisting patterns BSP of the present disclosure. In other words, the principle described above may also be applied to two material layers manufactured by different processes, so as to make the pattern density of one of the material layers parallel to the flexing axis FX be larger, and this material layer may be used as the assisting layer BSL. It should be noted that, although the linear patterns of the touch layer 120 are referred to as the touch elements 116a, the touch elements 116a' and the touch elements 116b, the linear patterns may also be wires in the touch layer 120 for electrically connecting the touch elements in different embodiments.

According to the present disclosure, an electronic device including a flexible display device may have an assisting layer, and the assisting layer may include a plurality of assisting patterns, so as to be helpful to make the flexible display device be flexed toward a predetermined direction, and reduce the adverse stress effects in other directions. The difference between the pitch of the assisting patterns and the pitch of other patterns (e.g., the scanning lines or the data lines) in the display device that are generally parallel to the assisting patterns is at least more than twice, and the ratio of the pitch of the assisting patterns to the pitch of the other patterns described above is greater than or equal to 2 and less than or equal to 200. This design may reduce the optical ripple interference and provide better display effects.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A flexible display device, comprising:
 a first layer comprising a plurality of first patterns having a first pitch; and
 a second layer overlapping with the first layer and comprising a plurality of second patterns having a second pitch,
 wherein a ratio of the first pitch to the second pitch is greater than or equal to 2 and less than or equal to 200, one of the plurality of first patterns has a first width, one of the plurality of second patterns has a second width, and a ratio of the first width to the first pitch is less than a ratio of the second width to the second pitch.

2. The flexible display device according to claim 1, wherein the second layer is disposed on the first layer.

3. The flexible display device according to claim 2, wherein the second layer is a wire grid polarizer.

4. The flexible display device according to claim 1, wherein the ratio of the second width to the second pitch is greater than or equal to 0.3 and less than or equal to 3.

5. The flexible display device according to claim 1, further comprising a flexible substrate thereon disposed the first layer.

* * * * *